United States Patent
Moawad et al.

(10) Patent No.: US 9,701,566 B2
(45) Date of Patent: Jul. 11, 2017

(54) FABRICATION OF NANOPOROUS GLASS FIBER FOR FLEXIBLE BIOSCAFFOLDS AND OTHER PRODUCTS

(75) Inventors: Hassan M.M. Moawad, Bethlehem, PA (US); Himanshu Jain, Bethlehem, PA (US)

(73) Assignee: Lehigh University, Bethlehem, PA (US)

(*) Notice: Subject to any disclaimer, the term of this patent is extended or adjusted under 35 U.S.C. 154(b) by 76 days.

(21) Appl. No.: 13/273,577

(22) Filed: Oct. 14, 2011

(65) Prior Publication Data
US 2012/0094122 A1  Apr. 19, 2012

Related U.S. Application Data

(60) Provisional application No. 61/393,267, filed on Oct. 14, 2010, provisional application No. 61/436,446, filed on Jan. 26, 2011.

(51) Int. Cl.
| | |
|---|---|
| C03B 37/022 | (2006.01) |
| C03C 3/097 | (2006.01) |
| C03C 4/00 | (2006.01) |
| C03C 13/00 | (2006.01) |
| C03C 25/66 | (2006.01) |

(52) U.S. Cl.
CPC ............ C03B 37/022 (2013.01); C03C 3/097 (2013.01); C03C 4/0007 (2013.01); C03C 13/006 (2013.01); C03C 25/66 (2013.01); Y10T 428/2975 (2015.01)

(58) Field of Classification Search
CPC ........................... C03B 37/022; C03C 13/005
USPC ............................................. 65/472
See application file for complete search history.

(56) References Cited

U.S. PATENT DOCUMENTS

| | | | | |
|---|---|---|---|---|
| 3,650,721 | A * | 3/1972 | Hammel et al. | 65/472 |
| 3,758,284 | A * | 9/1973 | Haller | 65/31 |
| 4,395,271 | A * | 7/1983 | Beall et al. | 65/31 |
| 5,043,369 | A * | 8/1991 | Bahn et al. | 523/466 |
| 6,511,511 | B1 * | 1/2003 | Slivka et al. | 623/23.75 |
| 6,993,406 | B1 | 1/2006 | Cesarano, III | |
| 8,389,018 | B2 | 3/2013 | Jain | |
| 2005/0263918 | A1 | 12/2005 | Heidenreich | |
| 2007/0203584 | A1 | 8/2007 | Bandyopadhyay | |
| 2008/0034801 | A1 * | 2/2008 | Canham et al. | 65/439 |
| 2008/0038534 | A1 | 2/2008 | Zenati | |
| 2008/0060382 | A1 * | 3/2008 | Rake et al. | 65/21.2 |
| 2010/0015244 | A1 * | 1/2010 | Jain et al. | 424/602 |

FOREIGN PATENT DOCUMENTS

WO    WO 2008101011 A1 *  8/2008

OTHER PUBLICATIONS

Elmer, T, Porous and Reconstructed Glasses, ASM International, 1992, 1-2.*
Clupper et al., "In vitro bioactivity of S520 glass fibers and initial assessment of osteoblast attachment", J Biomed Mater Res A. Oct. 1, 2003; 67(1):285-94.*
Clupper et al., "Bioactive evaluation of 45S5 bioactive glass fibres . . . " Journal of Materials Science: Materials in Medecine, vol. 15, 2004, pp. 803-808.*
Korean Intellectual Property Office, "International Search Report and the Written Opinion of the international Searching Authority" prepared for PCT/US2008/053851, mailed on Jun. 25, 2008.
Marlene De Barros Coelho et al., "Sol-Gel Synthesis of Bioactive Glass Scaffolds for Tissue Engineering: Effect of Surfactant Type and Concentration," Journal of Biomedical Materials Research Part B: Applied Biomaterials, 2005, vol. 75, Issue 2, pp. 451-456.
Xiaoxia Yan et al., "The In-vitro Bioactivity of Mesoporous Bioactive Glasses," Biomaterials, 2006, vol. 27, pp. 3396-3403.
C.C. Lin et al., "Na2CaSio206-P205 Based Bioactive Glasses. Part 1: Elasticity and Structure," J. Non-Cryst. Solids 351, 3195-203 (2005).
J.M. Oliveria, et al., "Effect of Si02 on amorphous phase separation of CaO-P205-5i02-Mg0 glasses", J. Non-Cryst. Solids 273 (2000) 59-63.
Jing Yi, et al. "Sol-gel derived mesoporous bioactive glass fibers as tissue-engineering scaffolds" J. Sol-Gel Sci Technol 45 (2008) 115-119.
L.L. Hench, et al., "Bonding mechanisms at the interface of ceramic prosthetic materials," J. Biomed. Mater. Res. 5 [6] (1971) 117-141.
Wei Xia, et al. "Fabrication and in vitro biomineralization of bioactive glass (Bg) nanofibers" Nanotechnology 18 (2007) 135601-135607.

* cited by examiner

*Primary Examiner* — Cynthia Szewczyk
(74) *Attorney, Agent, or Firm* — Saul Ewing LLP (57) ABSTRACT

Provided herein are novel nanoporous glass fibers, and methods of preparing and using such fibers. In some embodiments, articles are made from particular glass starting materials, such as soda-lime phosphosilicate glass fabricated by melt-quench methods. The articles include nanoporous fibers that can be used alone, or sewn, woven, bundled, and otherwise incorporated to form nanoporous articles, including bioactive articles.

22 Claims, 10 Drawing Sheets

FIG. 8
XRD S520 fiber after heat treatment [700°C for 1hr].

FABRICATION OF NANOPOROUS GLASS FIBER FOR FLEXIBLE BIOSCAFFOLDS AND OTHER PRODUCTS

CROSS REFERENCE TO RELATED APPLICATIONS

This application claims priority to U.S. Provisional Patent Application Ser. No. 61/393,267 filed Oct. 14, 2010, and to U.S. Provisional Patent Application Ser. No. 61/436,446 filed Jan. 26, 2011, which applications are hereby incorporated by reference in their entirety.

STATEMENT REGARDING FEDERALLY SPONSORED RESEARCH OR DEVELOPMENT

This subject matter is related to work conducted at least in part with financial support from the United States National Science Foundation's International Materials Institute for New Functionality in Glass (DMR-0409588) and Materials World Network (DMR-0602975) programs. The government of the United States may have certain rights herein.

FIELD

This disclosure pertains to nanoporous fibrous glass materials. In some embodiments, articles are made from particular glass starting materials, such as soda-lime phosphosilicate glass fabricated by melt-quench methods. The articles include nanoporous fibers that can be used alone, or sewn, woven, bundled, and otherwise incorporated to form nanoporous articles, including bioactive articles.

BACKGROUND OF THE INVENTION

Regenerative medicine, generally, seeks to repair damaged or diseased tissues to their original state or function. For example, regenerative medicine seeks to help natural healing processes to work faster by using special materials with human cell cultures, often referred to as "scaffolds" or "bioscaffolds," which act as three-dimensional templates for cell growth and differentiation and formation of living tissues.

Synthetic scaffolds have been proposed as a new means of tissue reconstruction and repair. Scaffolds belong to a new generation of biomedical structures, which rely on the concept of regeneration of diseased or damaged tissue to its original state or function. In contrast, current clinical methods are based on replacement by implantation or transplantation. Current clinical methods such as implantation or transplantation impart drawbacks such as a lack of ability to self-repair, limited vascularization of implants, limited number of donors, risk of disease transmission and possibility of rejection of transplanted tissues.

Scaffolds serve as both a physical support and as an adhesive substrate for isolated cells, during in vitro culturing and subsequent in vivo implantation. Scaffolds may be used to deliver cells to desired sites in the body, to define a potential space for engineered tissue, and/or to guide the process of tissue development. Cell transplantation on scaffolds has been explored for the regeneration of skin, nerve, liver, and pancreas tissues using various biological and synthetic materials. In particular, scaffolds containing dual porosity at the nanoscale and macroscale have been alleged to exhibit better performance, albeit in terms of formation of hydroxycarbonate apatite, cell adhesion, proliferation and differentiation, and vascularization. Known materials, however, lack sufficient flexibility to be practical in many bioscaffold applications.

Accordingly, a continuing and unmet need exists for new and improved synthetic bioactive tissue scaffolds, scaffold materials, as well as for methods for fabricating scaffolds having multi-modal porosity, and especially including controlled nanoporosity. A further continuing need exists for bioactive and biocompatible nanoporous glass systems (such as soda-lime phosphosilicates), including fibrous glasses and textiles having morphology and textures that enable formation of advantageous tissue response, such as formation of a bonelike hydroxyapatite layer, and/or soft tissue growth where desirable.

SUMMARY OF THE INVENTION

The methods and materials described herein provide novel biocompatible nanoporous glass fibers, and articles comprising one or more of those novel fibers. In some embodiments, the articles include bioactive porous articles such as tissue scaffolds characterized by novel, biocompatible pore structures that include pores of several to tens of nanometers in size. The methods include methods of manufacture, as well as methods of use. In some examples, the methods of use enhance the repair and regeneration of tissue, such as muscle, tendons, ligaments, and bone, among other tissues.

In one embodiment, nanoporous glass fibers are provided. An exemplary fiber is a biocompatible, bioactive silica-based fibers comprising a phase-separated glass characterized by the presence of nanoporosity.

In another embodiment, a method of making a nanoporous ceramic material comprises the steps of: providing a melt composition comprising phase-separated glass; drawing the melt composition to form at least one fiber; heating the fiber to a temperature sufficient to convert at least a portion of the phase-separated glass of the fiber to a ceramic; and leaching the fiber to thereby produce a nanoporous fiber.

In yet another embodiment, the method of making a nanoporous fiber comprising glass material includes the steps of: providing a starting material comprising phase-separated glass; heating the starting material to form a melt; drawing the melt to form at least one fiber; heat treating the at least one fiber; and thereafter leaching the at least one fiber with a leaching solution for a time sufficient to thereby produce a nanoporous fiber.

DETAILED DESCRIPTION

As tissue engineering develops into the future of treatments requiring tissue replacement, new materials are needed to function as bioscaffolds, and especially as nano-macroporous, and flexible bioscaffolds. The inventors have previously pioneered methods for fabricating nano-macro porous bioactive glass for bone replacement. Those materials have been monolithic rigid structures suitable for many bone replacement conditions. However, in certain medical applications, a flexible bioscaffold is preferred, and one that is porous to allow tissue to grow in and around it. As described herein, the inventors have discovered that bioscaffolds perform better if they are nanoporous and fibrous for certain applications. The present inventions are believed to be the first that fulfills those needs. Indeed, as described herein, the experiments conducted to date indicate that certain bioactive glass fibers and articles formed therefrom are useful also for soft tissue repair such as muscles. The present inventions thus provide a novel nanoporous bioactive glass fiber that is useful for such soft tissue applications, as well as in hard tissue applications.

Provided herein are novel repeatable methods for creating interconnected nanoporous glass fiber. It combines the advantages of the conventional melt-quench processing, and at the same allows the introduction of controlled nanoporosity. As used herein, porosity is characterized by an interconnected microstructure of nanopores. As used herein, macropores have an average pore diameter of greater than about 10 micrometers. Nanopores, as defined and used herein, have an average diameter of less than about 100 nanometers.

When applied to soda-lime phosphosilicate glass system, our methods provide novel nanoporous glass fibers having many applications, such as a superior tissue bioscaffold. The same methods, when applied to other glass and glass-like compositions, yield unique nanoporous fibers useful as a matrix for cell transplantation, drug delivery, catalysis, separation of fluids, and any other application where a nanoporous, inert, glass or glass-like fiber can be incorporated to provide desirable features such as high surface area and flexibility.

When the tissues of our bodies, such as bone, muscle or ligaments, are damaged by disease or accident, a promising treatment is to insert healthy cells which can grow and repopulate the injured region. However, delivering cells to the damaged region and ensuring that they remain in place and grow in the correct way is a great challenge. Thus, in the field of tissue engineering, one of the most important primary goals is the development of scaffold structure that would help repair damaged or diseased tissue to its original state. Material selection is an essential parameter for the bioscaffold. Additionally, the geometrical architecture of the bioscaffold is very important. Bioactive glasses are the most promising candidates for use in the construction of bioscaffolds for hard tissues. Recently, bioactive silicate glasses containing multi-scale porosity, at the nano and macroscale, have shown superior in vitro performance in terms of crystallization of HCA, cell adhesion and proliferation and also in vivo vascularization. With this development, next there is increasing interest in the fabrication of flexible bioactive glass structures such as felt, cloth, gauge, etc. for the repair of hard as well as soft tissue, which may be used as bioscaffolds in a wider range of patients. Ideally, the new flexible structure should combine the advantages of nano-porosity with mechanical flexibility in a material that meets other biological, physical and chemical properties required of bioscaffolds Bioactive glass fibers have the potential to function as cell supports for extracellular matrix production and tissue regeneration. The present invention provides novel nanoporous fibers and methods for preparing and using such nanoporous bioactive glass fibers. Indeed, the nanoporosity provides a fiber having better performance than other bioactive glasses, with the further advantage of being biodegradable. Indeed, controlling the porosity provides a method to control the in vivo degradation rate.

The methods herein provide advantages over other known methods of providing bioactive glasses. For example, the so-called 'Vycor' process is the standard method for introducing porosity in bulk glasses prepared by the melt-quench method, but its application in bioactive fibers leading to nano-scale porosity has not been demonstrated. Further, although nanoporosity has been introduced in glasses prepared by the sol-gel process, the resulting glasses suffer from cracking, poor strength, as well as very small yields. The present melt-drawn-heat-etch method combines the advantages of melt-drawing in air with the stability from the mixing of alkalis. Additionally, the present method allows the control of interconnected nanoporosity in indefinitely long fibers of various diameters. The process is based on the creation of interconnected phase separated structure followed by selective leaching of some selected parts of the separate phases.

In one example, a method of fabrication for nanoporous fibers comprises three steps. In this example, the first step is the selection of glass composition based on the factors identified herein. One factor involves the starting glass composition's ability to easily be converted into fiber without significant crystallization and interconnected phase separation. For example, an appropriate glass composition is soda-lime potassia phosphosilicate [20.9$Na_2O$—7.1$K_2O$—18CaO—2$P_2O_5$-52$SiO_2$ (mol %)], also referred to herein as "S520". S520 is a bioactive glass. An important advantage of the 5520 composition arises from its mixed alkali composition, which we discovered gives rise to advantages such as greatly inhibited devitrification and reduced fragility during fiber forming process.

In the second step of this example, the selected starting composition is melted, followed by the drawing of the composition to form fibers in air.

In this example, the third step is a heat treatment to induce phase separation at the nano (i.e. nanometer) size scale. The phases form a continuous, interconnected nanostructure including at least a phosphate-rich and another silicate-rich phase. In other words, the heat treatment step results in a glass fiber having at least two nano-size phases that are dispersed homogeneously otherwise.

In this example, the fourth step is a chemical treatment or "leaching" step to desirably dissolve away some selected parts of the separate phases thereby producing a novel nanoporous glass fiber. Optionally, this step also involves rinsing the fiber to stop the leaching process.

In methods of use herein, the novel nanoporous glass fiber can be used to fabricate flexible structures like felt, surgical textiles, gauzes, and other biocompatible materials for use in vivo or in vitro. For example, in making a nanoporous cloth, it would be advantageous to weave glass fibers after drawing, and then implement the remaining steps.

In further examples, a heat-plus-chemical treatment method based on spinodal decomposition followed by devitrification was performed in our laboratory for introducing multi-modal, interconnected nano-macro porosity in bulk 45S bioactive composition. We determined that for making flexible bioscaffolds and other biocompatible products, glass fibers of similar nanopore structure are needed, which can be used to fabricate felt, cloth, etc. Unfortunately, 45S glass proved unsuitable for fiber drawing, and hence we pursued other glasses for making fibers and fiber-based products. We were successful in establishing methods for forming nanoporous fibers comprising a bioactive $20.9Na_2O$—$7.1K_2O$—$18CaO$—$P_2O_5$-$52SiO_2$ (also known as "S520") composition. Our methods provide a novel nanoporous glass fiber suitable for bioactive applications, among other uses.

Applying the methods herein, in Step 1 we selected S520 as a starting material. In step 2, we then formed a melt comprising the starting material to draw the melt to form glass fibers with diameter of about 100 micrometers or more.

In step 3, the drawn fibers from Step 2 were heat treated at a temperature of between about 600 to about 950° C. for between about 30 to about 60 mins in box furnace conditions. The temperature and time were selected and controlled based upon the desired size, distribution and volume fraction of nano-porosity.

In step 4, the heat treated fibers of Step 3 were allowed to cool, and then were leached in an acid environment to form pores. For example, leaching in various concentrations of HCl at various temperatures for various times induced the formation of varying nanoscale porosity. In these examples, the concentration of the acid bath, the temperature of the acid bath, and the time of exposure of the fiber in the acid bath are controllable to induce the desired amount of porosity. Other factors that affect porosity are believed to be the fiber drawing rate (i.e. the cooling rate during drawing) and fiber diameter besides the starting batch composition of the glass.

In this example, the S520-based fibers made were between about 100 µm to about 150 µm thick upon drawing and were free of pores. After leaching, the fibers were of about the same thickness, but were characterized by porosity on the nanometer scale. The porosity was measured at between about 40% to about 68% of the fiber by volume. As generally shown in FIGS. 1-8, the resulting exemplary nanoporous glass fibers were characterized and tested, such as by scanning electron microscopy and porosimetry. Those fibers were characterized as having interconnected nanopores of an average pore diameter of between about 10 nm to about 60 nm in size. In some embodiments, the pore diameters were no larger than about 60 nm. Notably absent were any macropores, which are undesirable in the fibers since they weaken the fiber tensile strength significantly.

By way of further explanation, the method was demonstrated using the example of soda-lime potassia phosphosilicate glass fibers that are drawn from the melt in air. The drawn fiber is heat treated to produce interconnected phase separation at nano scale, followed by selective leaching of specific phases. The pore structure of resulting glass fiber, which consists of interconnected pores several to tens of nanometers in size, is appropriate to provide enhanced soft tissue regeneration performance. Additionally, our "melt-draw-heat-etch method" can be extended to other compositions with interconnected phase separation, which may be more suitable for applications other than bioscaffolds. The promising compositions will consist of glass forming trivalent or pentavalent oxides partially substituting for $SiO_2$ to varying extent. The present invention is simple and inexpensive, and is expected to have applications in diverse fields, such as (but not limited to) tissue engineering, biocatalysts, and biosensors.

The methods herein for preparing nanoporous glass fibers are based on a combination of steps involving melting, drawing, heat treating, and etching processes. For example, a glass fiber is drawn in air from a melt at an appropriate temperature. After drawing, fiber is heat treated at a suitable temperature to produce interconnected phase separation at nano scale, followed by selective leaching of some selected phases in a suitable etchant. This process for making interconnected nanoporous glass fiber is demonstrated by using the example of soda-lime potassia phosphosilicate as follows, but is applicable to any other glass system that exhibits interconnected phase separation in the glassy state.

In one example, the method involves selecting a glass composition that can be easily drawn into a fiber without crystallization, as well as one that can be heat treated to form interconnected phase separation. In an embodiment, we selected the composition of soda-lime potassia phosphosilicate [$20.9Na_2O$—$7.1K_2O$—$18CaO$—$2P_2O_5$-$52SiO_2$ (mol %)] bioactive glass (S520) for the demonstration of the method. This composition has the benefit of stability against crystallization for the mixing of two alkalis viz, sodium and potassium, but it is possible to find single alkali or alkali-free glasses that satisfy this requirement.

In the second step of this embodiment, a preselected amount of several starting chemicals were weighed in appropriate ratio, mixed and ground using an alumina mortar and pestle. The batch was melted in a platinum crucible at 1400° C. for 2 hours at a heating rate of 3° C./min. The homogenized melt was taken out from the furnace and the fiber was drawn in air within the temperature range between 1000-1100"C.

In the third step, to induce interconnected phase separation, the fiber was subjected to heat treatment at 700° C. for 1 h. In this example, the cooling rate was the same as the heating rate i.e. 5° C./min. Next, to create the interconnected nanoporous fiber glass, the heated sample was leached for 1 h in 1N HCl at 55° C. using 100 ml acid per gram of glass fiber. The resulting nonporous fiber was rinsed with deionized water and acetone to prevent from further etching with the acid and stored in a vacuum desiccator. It is important to recognize that if the bulk glass (i.e. not drawn into fibers) of the same starting material composition was subjected to the above heat treatment and etching steps, the resulting porosity (if any formed at all) will be significantly different from that obtained in the fibers.

The glass of composition $20.9Na_2O$—$7.1K_2O$—$18CaO$—$P_2O_5$-$52SiO_2$ (S520), was prepared with $SiO_2$ (99.99%), $CaCO_3$ (99%), $Na_2CO_3$ (99%), $Ca_5(OH)(PO_4)_3$ (99%) and $K_2CO_3$ (99%) as starting materials. The calculated batch of powders was mixed and ground using an alumina mortar and pestle. It was melted in a platinum crucible at 1300° C. for 2 hours. The homogenized melt was then drawn in air to form fibers. The fibers were then heat treated at 700° C. for 1 hour. The result was a fiber having a glass phase separated on nm scale with interconnected spinodal texture. To create nano-porosity, the heat treated glasses were leached for different selected times (15 minutes to 1 h) in 1M HCl at different selected temperatures (55 or 75° C.).

Thereafter, to identify the phases and observe microstructure the samples were analyzed by X-ray diffraction (XRD) and scanning electron microscopy (SEM). Hitachi 4300 Field Emission SEM was used to examine the samples of each glass fiber to elucidate the phase separation and microstructure. To avoid charging, the SEM samples were coated with carbon. The elemental distribution in different phases was determined by Energy Dispersive X-ray (EDX) spectroscopy device attached to the SEM-Hitachi 4300. EDX spectra were calibrated by Cu K and Cu L as reference for peak position, and collected by using an area scan of image with EDAX-Genesis software package. The parameters for data acquisition (time, full scale for intensity, pulse processing time) were kept the same for all the samples.

Figure 1A:
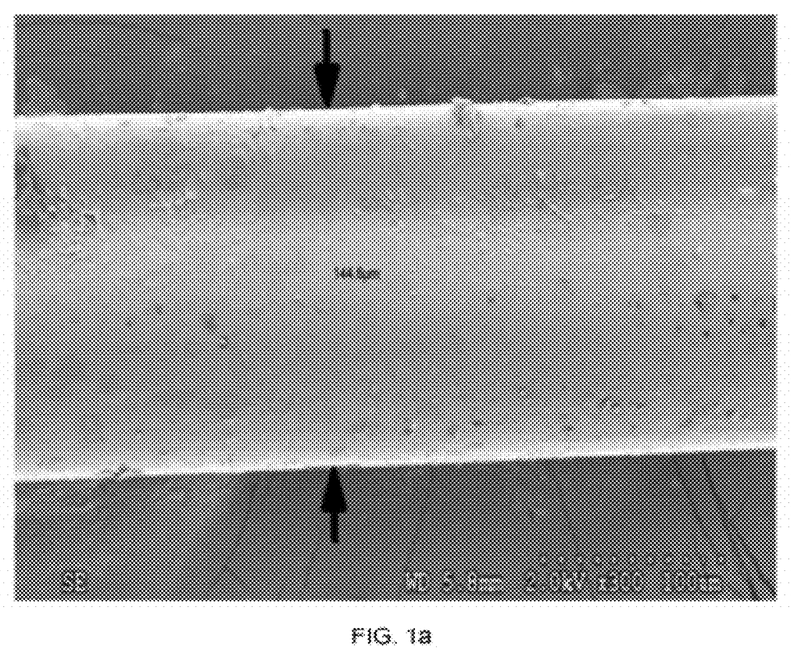
FIGS. 1a and 1b illustrate SEM micrographs of drawn glass fiber having no nanoporosity.
Figure 1B:
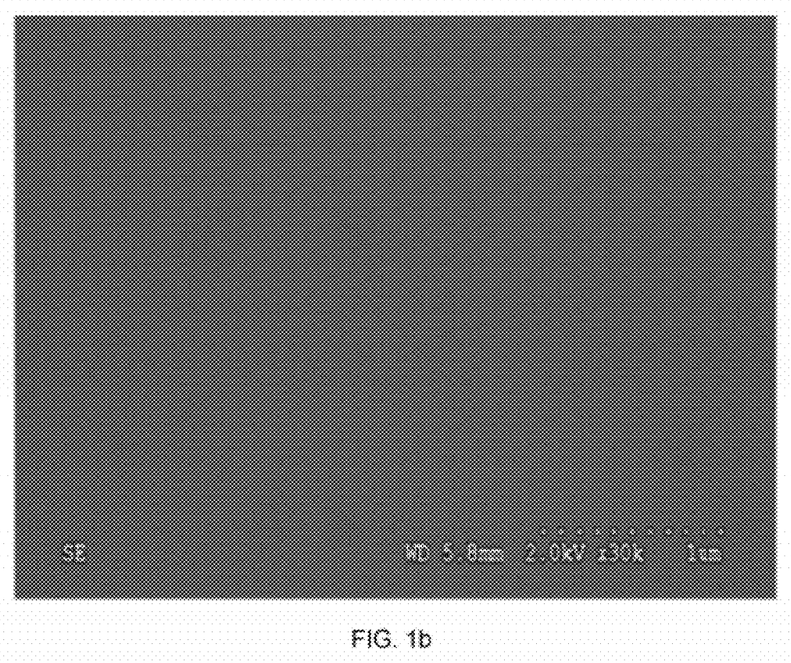

FIG. 1a and FIG. 1b show SEM micrographs of singular S520 glass fiber without any heat treatment or etching, at two different magnifications. Note that there is no nanoporosity in the fiber.

Figure 2A:
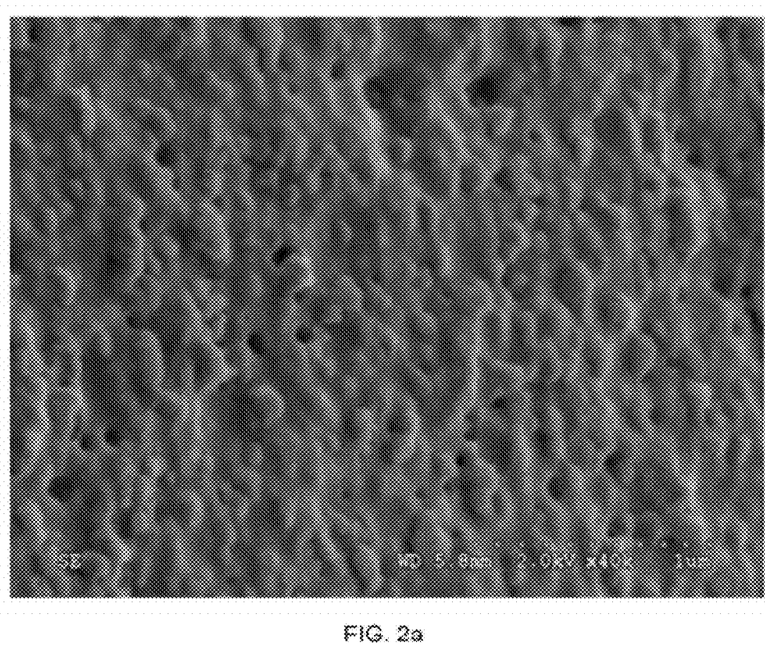
FIGS. 2a and 2b illustrate SEM micrographs of exemplary glass fiber after a heat treatment.
Figure 2B:
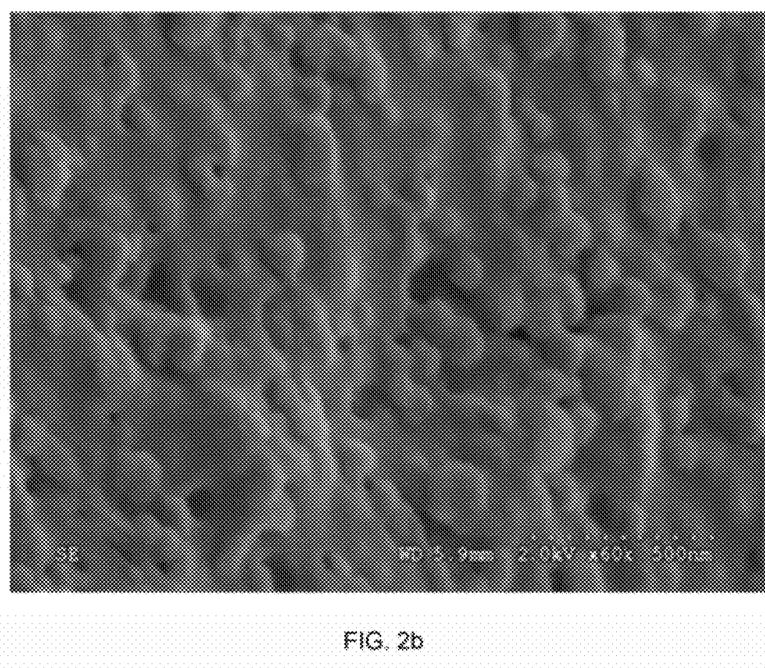

FIG. 2a and FIG. 2b show SEM micrographs of singular S520 glass fiber after a heat treatment at 70° C. for 1 h at two different magnifications.

Figure 3A:
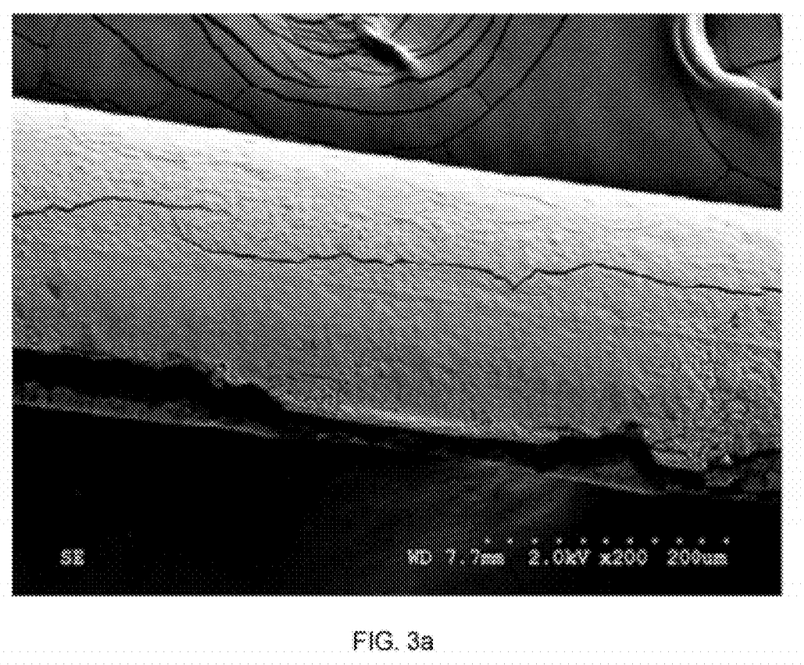
FIGS. 3a and 3b illustrate SEM micrographs of exemplary glass fiber after heat treatment followed by chemical leaching.
Figure 3B:
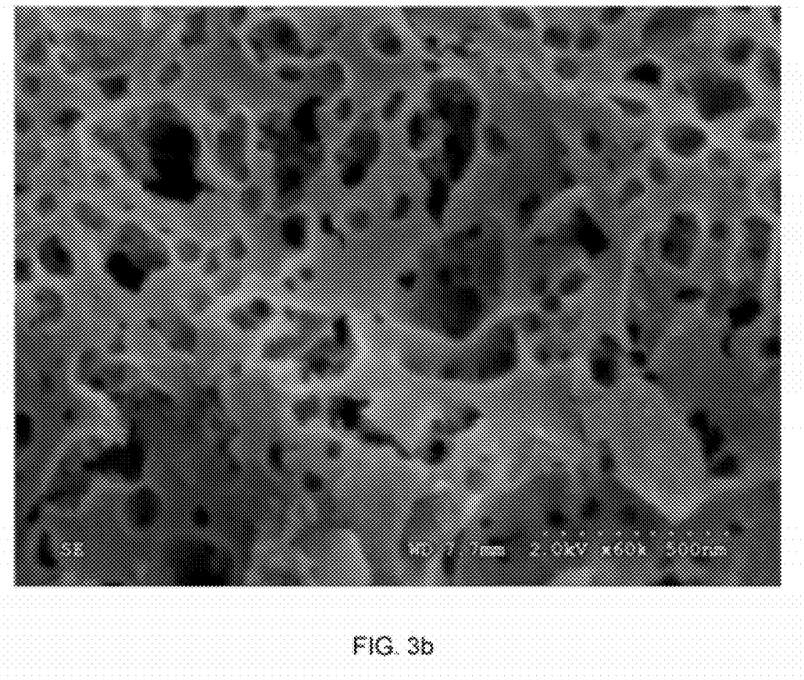

FIG. 3a and FIG. 3b show SEM micrographs of glass fiber S520 after heat [700 C for 1 h]+chemical leached [1M HCl at 55 C for 1 h] at 2 different magnifications, showing the distribution of nanoscale porosity.

Figure 4A:
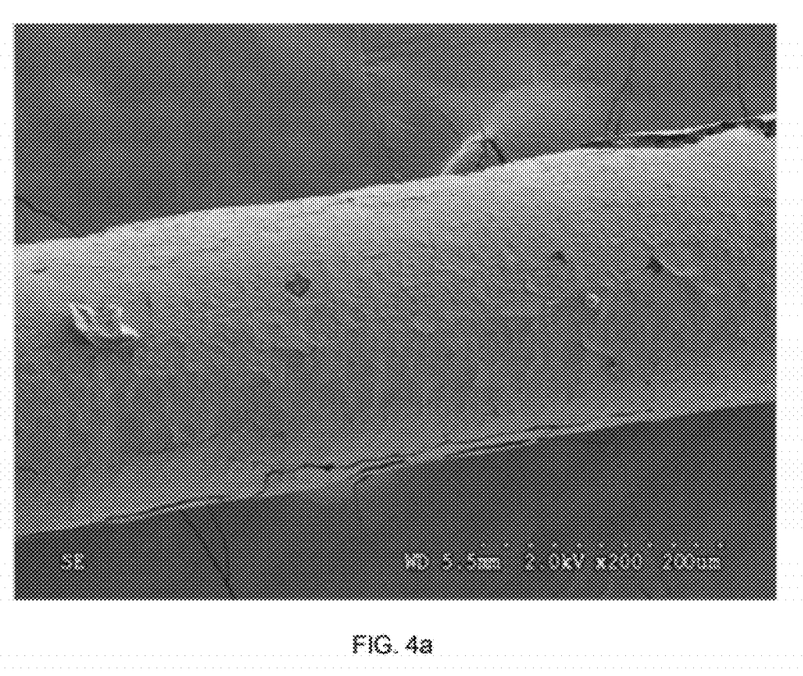
FIGS. 4a and 4b illustrate SEM micrographs of exemplary glass fiber after heat treatment followed by chemical leaching.
Figure 4B:
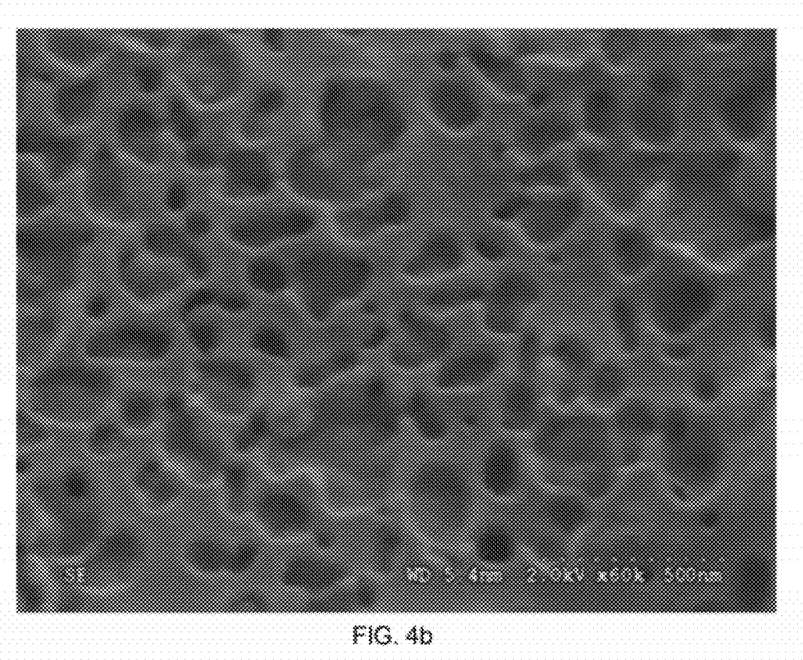

FIG. 4a and FIG. 4b show SEM micrographs of S520 glass fiber after heat [700 C for 1 h] followed by chemical leaching [1M HCl at 55 C for 15 minutes] at different magnifications, showing the distribution of nanoscale porosity.

Figure 5A:
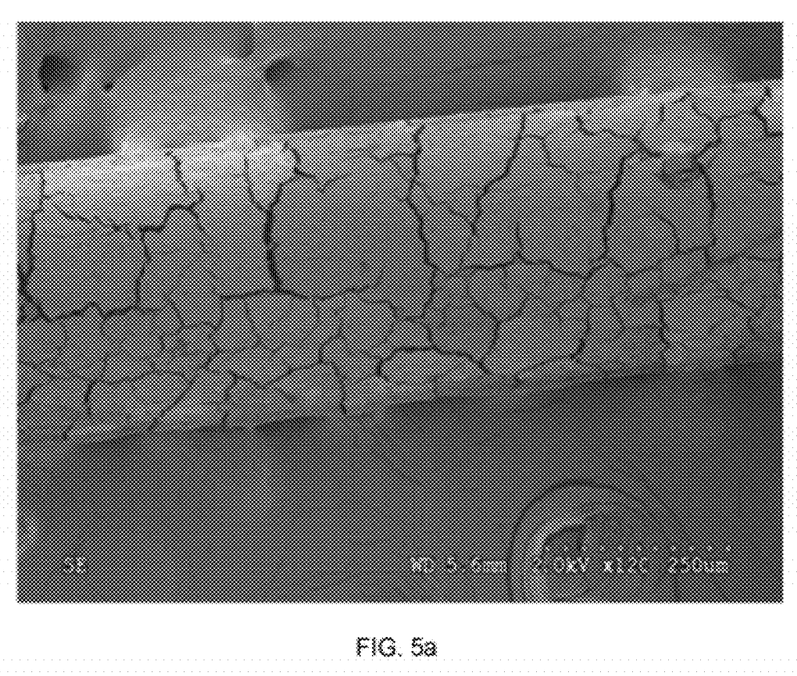
FIGS. 5a and 5b illustrate SEM micrographs of exemplary glass fiber after heat treatment followed by chemical leaching.
Figure 5B:
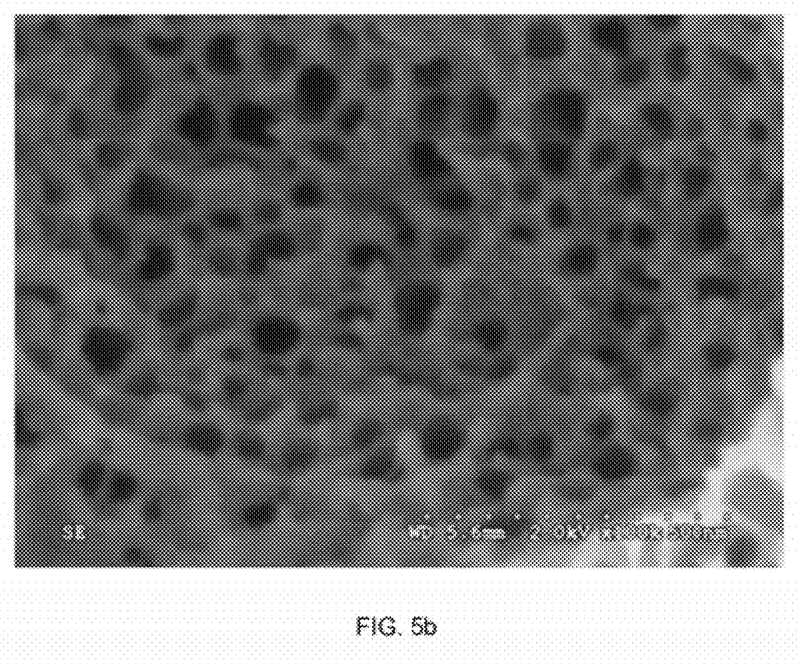

FIG. 5a and FIG. 5b show SEM micrographs of S520 glass fiber after heat [700 C for 1 h]+chemical leached [1M HCl at 75 C for 1 h] at different magnifications, showing the distribution of nanoscale porosity. However, as shown, this example exhibited undesirable cracking, likely attributed to excessive heat and over-exposure during heat treatment and/or leaching.

Figure 6A:
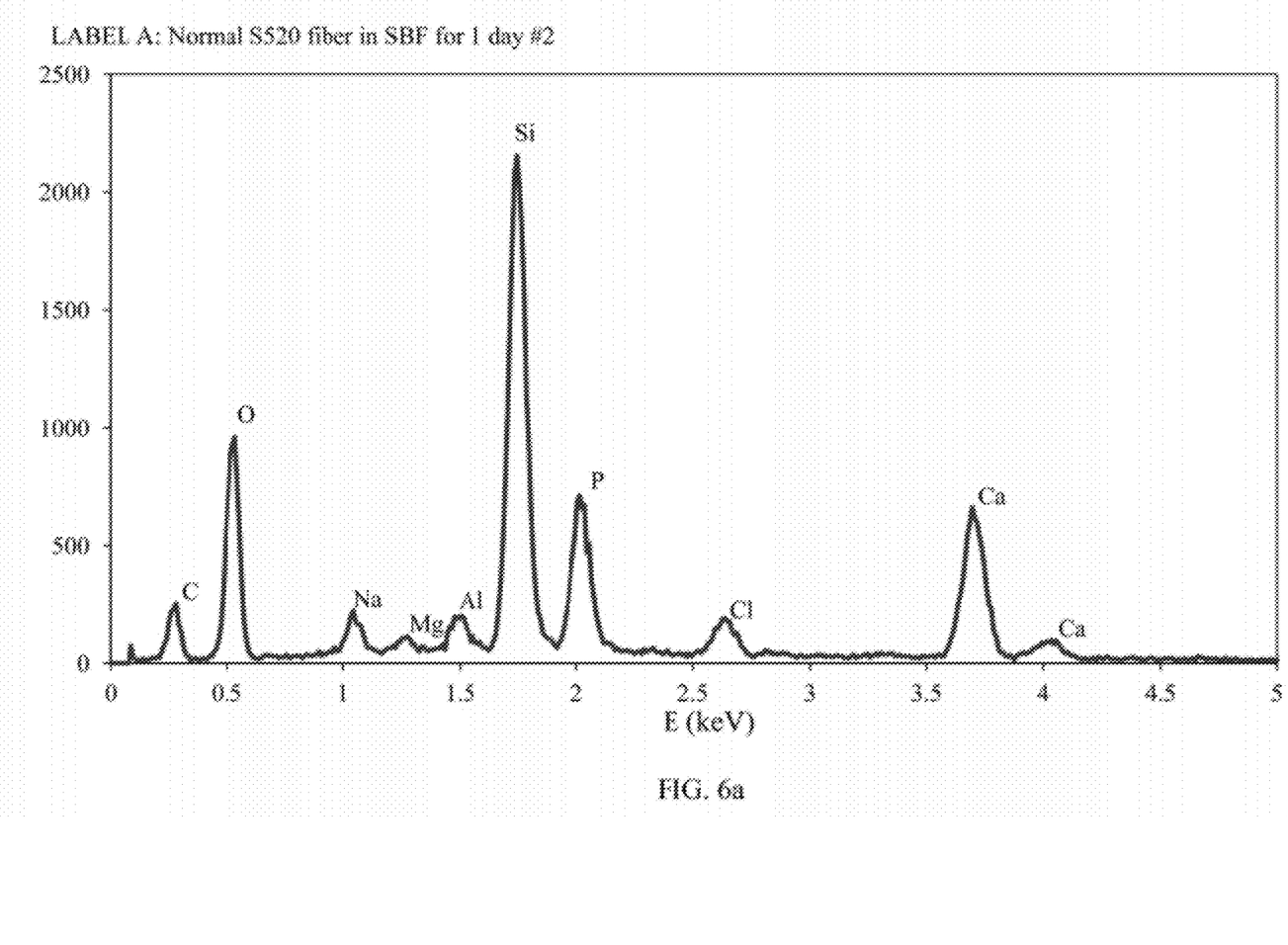
FIGS. 6a and 6b and 6c illustrate EDX spectra of exemplary glass fiber after leaching.
Figure 6B:
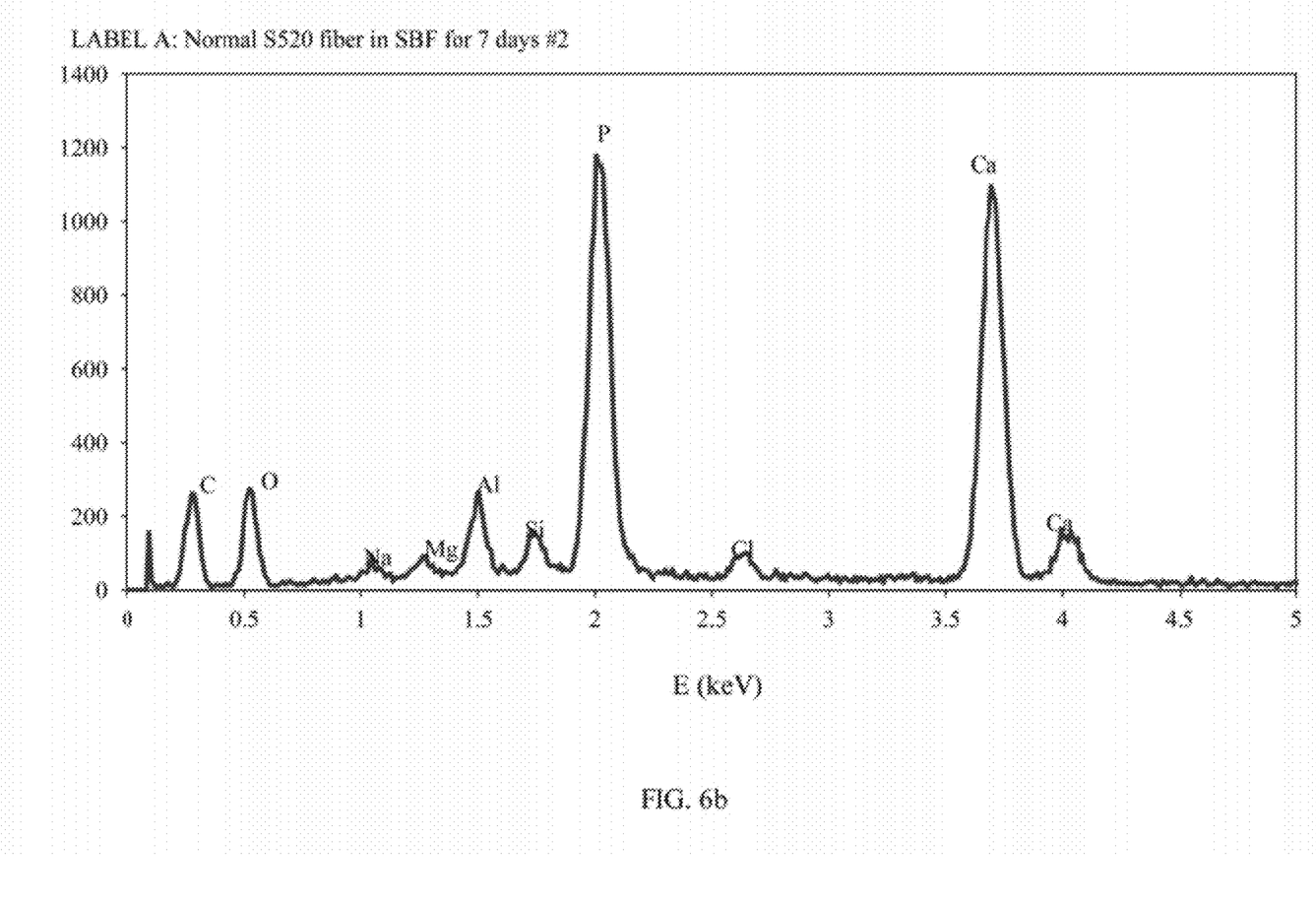
Figure 6C:
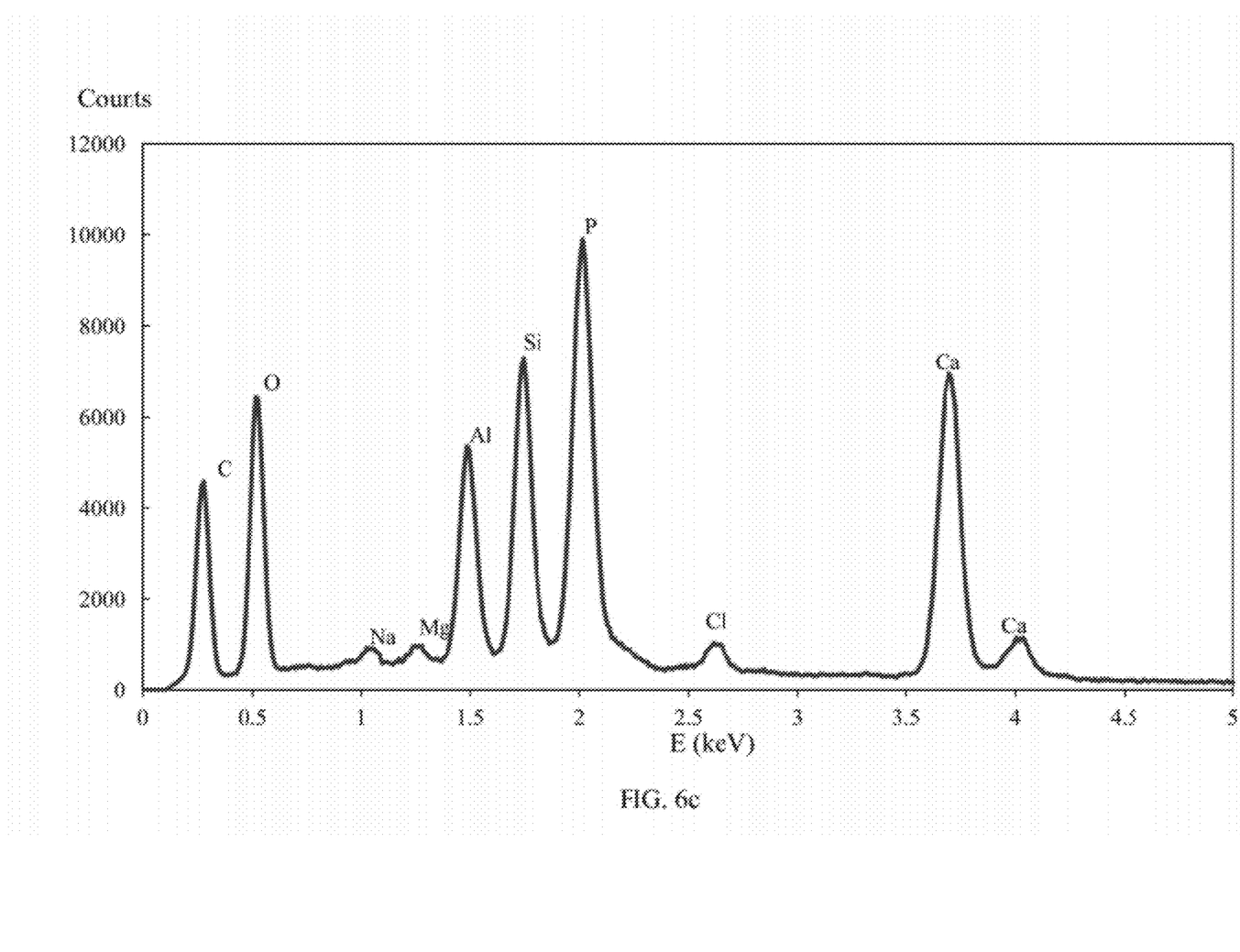

FIG. 6a and FIG. 6b and FIG. 6c, collectively, show EDX spectra of an exemplary nanoporous S520 fiber made by the methods herein, including heat treatment at 700 C. for 1 h followed by chemical leaching at 1M HCl at 55 C for 1 h. The figures show the exemplary S520 fiber after soaking for 1 to 7 days in SBF. In particular, FIG. 6a shows the specimen of nanoporous fiber without any treatment after 1 day in SBF; FIG. 6b) shows a specimen of the same fiber without any treatment after 7 days in SBF; and FIG. 6c shows a specimen of the same fiber that was heat+chemical treated after 7 days. Leaching thus increases the amount of porosity, as shown.

Figure 7A:
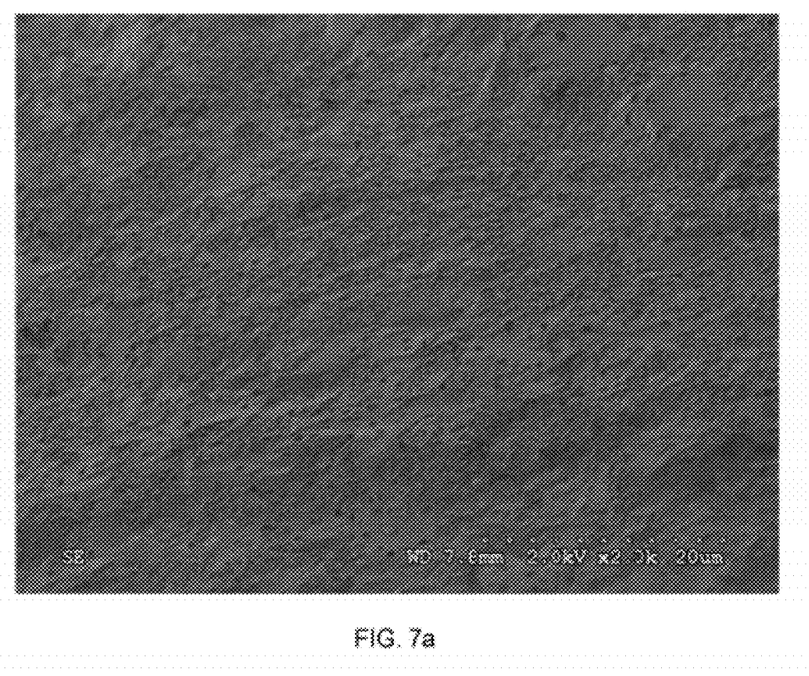
FIGS. 7a and 7b illustrate SEM micrographs of exemplary glass fiber after heat treatment.
Figure 7B:
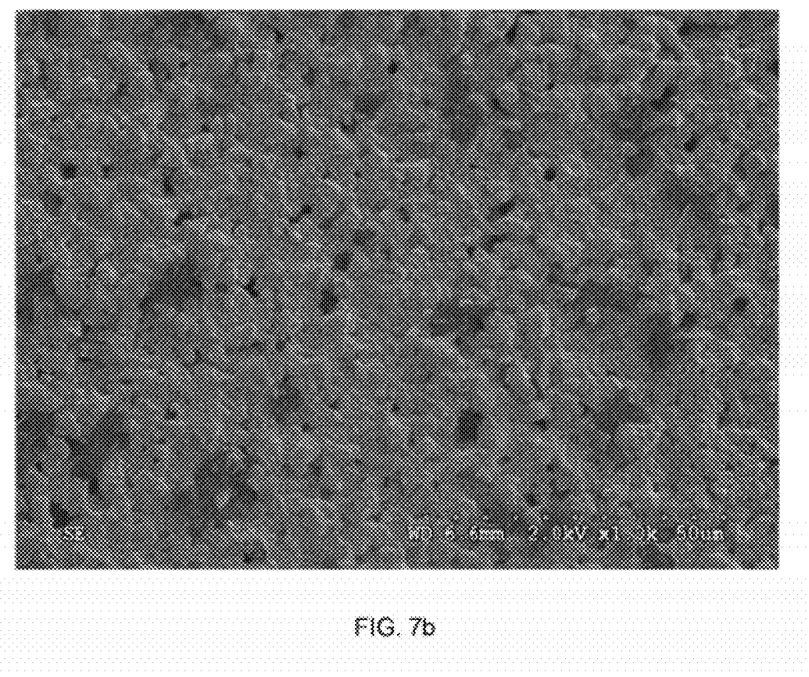
Figure 8:
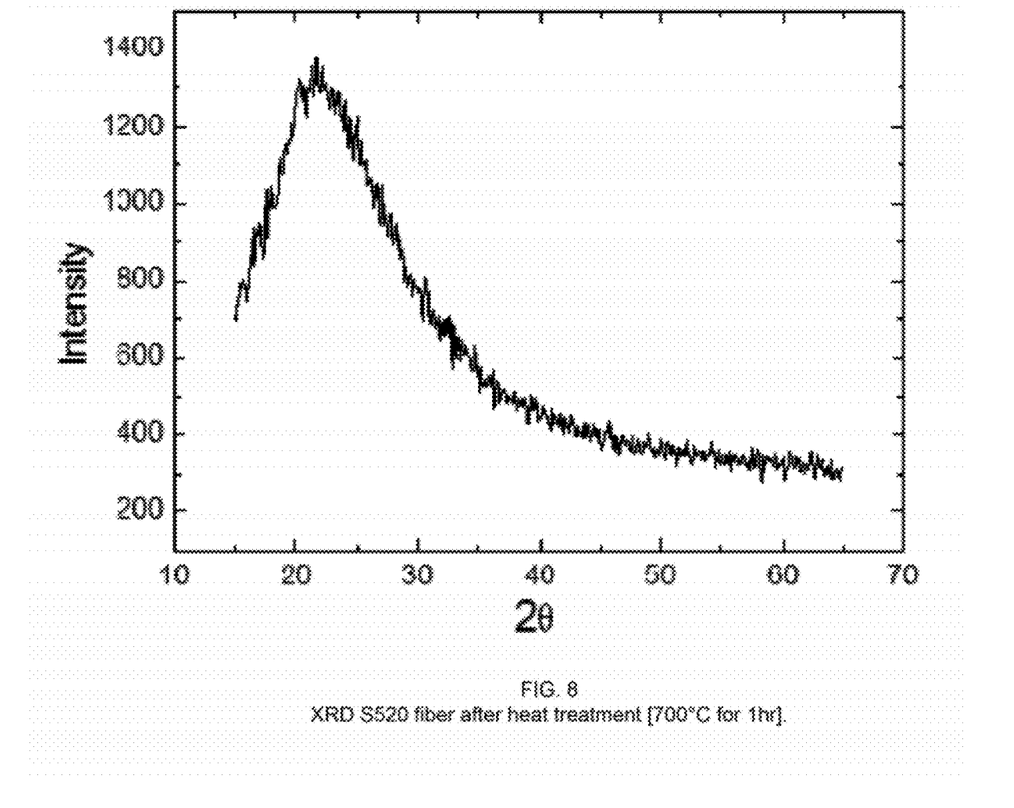
FIG. 8 shows a graphical representation of XRD of exemplary glass fiber after heat treatment.

FIG. 7a and FIG. 7b show, respectively SEM micrographs of S520 fiber after heat treatment. The fiber of FIG. 7a was heat treated at 800° C. for 1 h. The otherwise identical fiber of FIG. 8b was treated for 850° C. for 1 h.

FIG. 8 shows a graphical representation of XRD of a S520 fiber of the present invention after heat treatment at 700° C. for 1 h, confirming the amorphous structure of the sample.

Our methods are extendable to a wide range of compositions since interconnected phase separation is prevalent in numerous glass systems. These formulations would include but not limited to the present glass composition S520, suitable for cell transplantation. Further, other silica-based compositions and borosilicates can also be prepared using the same basic methods. The methods herein, and the nanoporous fiber articles formed thereby, can be selectively controlled and optimized for particular porosity and bioactive properties to make articles appropriate for use in applications such as in tissue engineering, drug delivery, fluid separation, catalysis, among others.

Our new methods produce nanoporous glass fiber that has the major advantages of providing a simple melt-drawn method to provide a fibrous bioactive composition, with nanoscale porosity for better cell response and control over any desired degradation rate. In contrast, efforts to form nanoporous glass fibers prepared by the more expensive sol-gel process were not successful. In any event, our method is relatively simple compared to any sol-gel process, making controllable nanoporosity in fibers that are unique, and also inexpensive to manufacture.

There has been much recent interest in nanoporous bioactive glass fibers for biomedical applications, which could be useful for making flexible structures. So far efforts to make such fibers have not succeeded. The present method when applied to S520 composition has not only solved this problem, but also established viability of the concept of flexible nanoporous scaffolds, which may be further improved by a suitable modification of composition.

The articles herein include novel nanoporous fibers made from glass starting materials. Suitable glass starting materials were described by the inventors in U.S. patent application Ser. No. 12/526,599 (hereinafter "the '599 Application"), which is hereby incorporated by reference in its entirety. The '599 Application provided new biocompatible materials, such as phospho-silicate glasses, e.g. CaO—$Na_2O$—$P_2O_5$—$SiO_2$ glasses prepared by melt-quench methods. In some examples, those methods were characterized by spinodal phase separation followed by crystallization of phases at very different length scales. Selective and controlled chemical leaching of these phases caused formation of interconnected multi-modal porosity, (with "multi-modal" being defined herein as characterized by pore sizes ranging from several nanometers (nanoporous) to tens or hundreds of micrometers). As described herein, those types of glasses can be used to form glass articles having only nanopores, or optionally also having macropores.

In the present application, Applicants have utilized phosphosilicate glasses such as those described in the '599 Application, as well as novel glasses and methods discovered since the '599 Application, to produce novel glass articles described herein. The novel glass articles produced by these new methods are fibrous nanoporous glass articles.

Additional features may be understood by referring to the accompanying drawings, which should be read in conjunction with the following detailed description and examples.

As generally described in the '599 Application, Soda-lime phosphosilicates may be used as bioactive glass because they promote strong bonding to tissue, while avoiding a foreign body (immune) response. For melt-processed soda-lime phosphosilicate bioactive glasses, low silica content and a high calcia and soda content are typically required for the glass to have a high surface reactivity in an aqueous medium. The primary role of sodium ions in the bioactive glass is to facilitate the glass melting process. The dissolution of $Na^+$, $P^{5+}$, and $Ca^{2+}$ from the glass in solution results in the formation of a silica-rich and a CaO—$P_2O_5$ rich layer. The latter layer promotes the formation of hydroxyapatite (HA), which has a calcium to phosphorus ("Ca/P") ratio compatible with bone structure, which is believed to be necessary to promote tissue binding to the glass. [C.-C. Lin, L.-C. Huang and P. Shen, "$Na_2CaSi_2O_6$—$P_2O_5$ Based Bioactive Glasses. Part 1: Elasticity and Structure," J. Non-Cryst. Solids 351, 3195-203 (2005).]

The inventors have discovered that, utilizing glass starting materials generally similar to those described in the '599 Application, they have accomplished the fabrication of novel glass articles having only nanoporosity (i.e. no macroporosity). In one example, the fabrication methods provide for novel glass fibers having only nanoporosity. The novel fibrous, nanoporous glass materials described herein have a variety of uses. For example, the fibers can be woven, bundled, sewn into biocompatible textiles, or otherwise gathered to form a biocompatible article, such as a wound covering, surgical mesh, or bioscaffold. For example, provided herein are methods of inducing tissue growth or regeneration in a mammal including a step of forming nanoporous glass fibers into a predetermined shape to form a biocompatible silica-based article, and implanting the biocompatible silica based article composition in a mammal in need thereof.

Likewise, methods are provided of stimulating cell growth or differentiation comprising a step of placing one or more cells onto a surface of a biocompatible nanoporous fiber-containing bioscaffold composition. Other uses for such nanoporous fibrous materials that will be readily appreciated in the art include use as filtration media (e.g., differential filtration), and as a drug delivery system in which a medicine leaches out of implanted material over predetermined time periods (e.g., days to years), among other uses.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. A method of making a nanoporous ceramic material comprising steps of:
    drawing a melt composition to form at least one fiber of a phospho-silicate glass having essentially no spinodal phase separation;
    heating the fiber to a temperature sufficient to convert at least a portion of the phospho-silicate glass to an amorphous ceramic with spinodal phase separation of at least two phases; and
    removing at least a portion of one of the at least two phases from the fiber, thereby producing a biocompatible fiber with interconnected nanoporosity.

2. The method of claim 1 wherein said phospho-silicate glass has the formula $20.9Na_2O$-$7.1K_2O$-$18CaO$-$2P_2O_5$-$52SiO_2$ (mol %).

3. The method of claim 1 wherein said removing comprises selectively leaching said one of said at least two phases.

4. The method of claim 1, wherein said biocompatible fiber is characterized by the absence of pores greater than about 60 nm.

5. The method of claim 4, wherein said biocompatible fiber is characterized by an average pore diameter of less than about 20 nanometers.

6. The method of claim 1, wherein the fiber has an average diameter of about 100 to about 150 μm.

7. The method of claim 1, wherein the biocompatible fiber has a pore volume of about 40% to about 68% of the fiber volume.

8. A method of making a nanoporous fiber comprising glass material, the method comprising the steps of:
    heating a starting material comprising a phospho-silicate glass to form a melt;
    drawing the melt to form at least one fiber;
    heat treating the at least one fiber to form an amorphous heat-treated fiber with spinodal phase separation of at least two phases; and
    removing at least a portion of one of the at least two phases from the at least one heat-treated fiber, thereby producing a biocompatible fiber with interconnected nanoporosity having pores no greater than about 60 nm.

9. The method according to claim 8, wherein the starting material comprises a glass of the formula $20.9Na_2O$-$7.1K_2O$-$18CaO$-$2P_2O_5$-$52SiO_2$ (mol %).

10. The method according to claim 9, wherein the step of heat treating comprises heating at a temperature of between about 600 to about 1100 degrees C. for a time of between about 45 minutes to about 1.5 hours.

11. The method of claim 9, wherein said removing comprises selectively leaching said one of said at least two phases.

12. The method according to claim 11, wherein the leaching solution has a pH of less than about 7, and wherein the leaching solution comprises an inorganic mineral acid.

13. The method according to claim 12, wherein the leaching solution is a 1N HCl solution.

14. The method according to claim 11, wherein the leaching step is carried out for about 1 h in 1N HCl at between about 55 to about 75 degree C.

15. The method of claim 11, wherein the step of leaching is performed for a time sufficient to produce nanopores t comprising between about 40% to about 68% of the fiber by volume.

16. The method according to claim 8, wherein the nanoporous fiber comprises nanopores having an average pore diameter of less than about 30 nanometers.

17. A method of making a nanoporous ceramic material comprising steps of:
    providing a melt composition for forming a phospho-silicate glass;
    drawing a phospho-silicate glass melt composition to form at least one fiber;
    heating the fiber to a form a ceramic with interconnected spinodal phase separation having at least two phases; and
    leaching the fiber to remove one of said at least two phases, thereby producing a nanoporous fiber having no pores larger than about 60 nm, wherein said nanoporous fiber is biocompatible.

18. The method of claim 17 wherein said phospho-silicate glass has the formula $20.9Na_2O$-$7.11K_2O$-$18CaO$-$2P_2O_5$-$52SiO_2$ (mol %).

19. A method of making a nanoporous ceramic material comprising steps of:
    drawing a melt composition in air to solidify said melt composition at a first temperature to form at least one fiber of a phospho-silicate glass;
    heating the fiber to a second temperature greater than said first temperature to convert at least a portion of the phospho-silicate glass to an amorphous ceramic with spinodal phase separation of at least two phases; and
    removing at least a portion of one of the at least two phases from the fiber, thereby producing a biocompatible fiber with interconnected nanoporosity.

20. The method of claim 19, wherein said second temperature is at least 600 C.

21. The method of claim 19, wherein said first temperature is room temperature.

22. The method of claim 19, wherein said phosphosilicate glass has the formula $20.9Na_2O$-$7.1K_2O$-$18CaO$-$2P_2O_5$-$52SiO_2$ (mol %).

* * * * *

UNITED STATES PATENT AND TRADEMARK OFFICE
CERTIFICATE OF CORRECTION

PATENT NO. : 9,701,566 B2
APPLICATION NO. : 13/273577
DATED : July 11, 2017
INVENTOR(S) : Hassan M. M. Moawad and Himanshu Jain It is certified that error appears in the above-identified patent and that said Letters Patent is hereby corrected as shown below:

In the Specification

In the Description:

Column 1, Lines 17-23, change "This subject matter is related to work conducted at least in part with financial support from the United States National Science Foundation's International Materials Institute for New Functionality in Glass (DMR-0409588) and Materials World Network (DMR-0602975) programs. The government of the United States may have certain rights herein." to "This invention was made with government support under DMR0602975 and DMR0844014 awarded by the National Science Foundation. The government has certain rights in the invention."

Signed and Sealed this
Fifth Day of July, 2022

Katherine Kelly Vidal
*Director of the United States Patent and Trademark Office*